United States Patent

Mizuno et al.

[11] Patent Number: 5,977,904
[45] Date of Patent: Nov. 2, 1999

[54] STRUCTURE OF APERTURE ANTENNA AND RADAR SYSTEM USING SAME

[75] Inventors: Hiroshi Mizuno, Kariya; Hiroshi Hazumi, Nagoya; Takeshi Matsui, Toyohashi, all of Japan

[73] Assignee: Denso Corporation, Kariya, Japan

[21] Appl. No.: 09/048,259

[22] Filed: Mar. 26, 1998

[30] Foreign Application Priority Data

Mar. 27, 1997 [JP] Japan .................................. 9-075980

[51] Int. Cl.$^6$ .................................................. G01S 13/93
[52] U.S. Cl. .................................................. 342/70
[58] Field of Search ................. 342/70, 71, 72, 342/107

[56] References Cited

U.S. PATENT DOCUMENTS

| | | | |
|---|---|---|---|
| 4,890,267 | 12/1989 | Rudolph | 367/105 |
| 5,422,649 | 6/1995 | Huang . | |
| 5,448,244 | 9/1995 | Komatsu et al. | 342/70 |
| 5,485,162 | 1/1996 | Sezai | 342/378 |
| 5,506,589 | 4/1996 | Quan et al. | 342/80 |
| 5,619,208 | 4/1997 | Tamatsu et al. | 342/70 |
| 5,724,042 | 3/1998 | Komatsu et al. | 342/70 |
| 5,731,778 | 3/1998 | Nakatani et al. | 342/70 |
| 5,757,307 | 5/1998 | Nakatani et al. | 342/70 |

FOREIGN PATENT DOCUMENTS

| | | |
|---|---|---|
| 459616A2 | 12/1991 | European Pat. Off. . |
| 707220A2 | 4/1996 | European Pat. Off. . |
| 733913A2 | 9/1996 | European Pat. Off. . |
| 2705169 | 11/1994 | France . |
| 6-242230 | 9/1994 | Japan . |
| 7-084029 | 3/1995 | Japan . |
| 7-094941 | 4/1995 | Japan . |

*Primary Examiner*—Daniel T. Pihulic
*Attorney, Agent, or Firm*—Pillsbury Madison & Sutro LLP

[57] ABSTRACT

An aperture antenna suitable for a radar system of an automotive vehicle is provided which includes three or more primary radiators and a feeding circuit. The feeding circuit is designed to supply electromagnetic signals to adjacent two of the primary radiators through discrete feeders to radiate in phase electromagnetic waves and to extract signals received by the two of the primary radiators separately. This enables the radiation of radar waves over a wider area without increasing the radiation power.

9 Claims, 4 Drawing Sheets

STRUCTURE OF APERTURE ANTENNA AND RADAR SYSTEM USING SAME

BACKGROUND OF THE INVENTION

1. Technical Field of the Invention

The present invention relates generally to a radar system which may be employed in anti-collision devices for moving objects such as automotive vehicles to monitor the position of a target present within a detectable zone and an aperture antenna used in such a radar system.

2. Background of Related Art

Monopulse radars are known as being suitable for anti-collision devices for moving objects.

Typical monopulse radars are designed to receive a radar beam reflected from a target concurrently through a pair of antennas arranged close to each other to determine the azimuth angle of the target based on a phase difference between received signals and amplitude thereof. The monopulse radars, however, have the drawback in that the radar beam has the directivity, so that a detectable zone of the azimuth angle of the target is limited to a narrow area where antenna-received beams overlap with each other.

For example, an automotive radar system requires quick detection of a vehicle which has cut in front of a radar-equipped vehicle and accurate detection of obstacles present on or near a road. Such detection, however, becomes difficult especially when the radar-equipped vehicle is traveling on a curved road. It is, thus, sought to widen further the detectable zone of the radar system.

SUMMARY OF THE INVENTION

It is therefore a principal object of the present invention to avoid the disadvantages of the prior art.

It is another object of the present invention to provide an improved structure of an aperture antenna capable of radiating electromagnetic waves over a wider area without increasing the radiation power.

It is a further object of the present invention to provide a radar system capable of tracking a target over a wider area.

According to one aspect of the present invention, there is provided an aperture antenna which comprises: (a) an electromagnetic wave converging device; (b) at least three primary radiators disposed on a focal plane of the electromagnetic wave converging device; and (c) a feeding circuit that feeds electromagnetic signals to two of the primary radiators to radiate in phase electromagnetic waves and that extracts signals received by the two of the primary radiators separately.

In the preferred mode of the invention, the feeding circuit includes a first common feeder connecting with a first radiator group consisting of some of the primary radiators arranged alternately through first discrete feeders, a second common feeder connecting with a second radiator group consisting of the other primary radiators through second discrete feeders, and switching means for selectively allowing and blocking passage of a signal through each of the first and second discrete feeders. A difference in length between any two of the first discrete feeders and a difference in length between any two of the second discrete feeders are integral multiples of a wavelength of the electromagnetic signals, respectively. An interval between any two of junctions of the first common feeder and the first discrete feeders and an interval between any two of junctions of the second common feeder and the second discrete feeders are integral multiples of the wavelength of the electromagnetic signals, respectively.

The switching means includes switching circuits each of which is disposed in one of the first and second discrete feeders so as to isolate each of the first and second discrete feeders electromagnetically from corresponding one of the first and second common feeders.

Each of the first and second discrete feeders is so connected to one of the first and second common feeders that a current standing wave that has the same wavelength as that of the electromagnetic signals and that is produced on each of the first and second common feeders during feed shows a node at each of the junctions. Each of the first and second discrete feeders includes a first line leading to one of the primary radiators and a second line leading to one of the first and second common feeders. The first and second lines are connected and disconnected electromagnetically through the switching means. A connection between the first and second lines of each of the first and second discrete feeders lies at the node of the current standing wave.

The switching means blocks the passage of the signal through each of the first and second discrete feeders by electrically opening the connection between the first and second lines of each of the first and second discrete feeders. The length of each of the second lines is an integral multiple of half the wavelength of the electromagnetic signals.

The switching means may alternatively block the passage of the signal through each of the first and second discrete feeders by establishing a short circuit between the connection of the first and second lines of each of the first and second discrete feeders and ground. In this case, the length of each of the second lines is the sum of an integral multiple of half the wavelength of the electromagnetic signals and one fourth of the wavelength of the electromagnetic signals.

The first and second common feeders may connect with the first and second discrete feeders through a first set of branch line and a second set of branch lines, respectively. In this case, a connection of the first set of branch lines to the first common feeder and a connection of the second set of branch lines to the second common feeder lie at a note of a current standing wave that has the same wavelength as that of the electromagnetic signals and that is produced on each of the first and second common feeders during feed.

The primary radiators are disposed in alignment with each other to form an antenna array. The first and second common feeders extend on both sides of the length of the antenna array.

According to another aspect of the invention, there is provided a radar system which comprises: (a) an aperture antenna including an electromagnetic wave converging device and at least three primary radiators disposed on a focal plane of the electromagnetic wave converging device; (b) a high-frequency oscillator that supplies high-frequency signals to the primary radiators through a first and a second common feeders to radiate in phase radar waves; (c) a first and a second signal separating circuit that are connected to the first and second common feeders, respectively, each of the first and second signal separating circuits separating signals appearing on one of the first and second common feeders into the high-frequency signal supplied from the high-frequency oscillator and a signal received by the aperture antenna; (d) a first and a second mixer that are connected to the first and second signal separating circuits, respectively, each of the first and second mixers mixing the high-frequency signal and the received signal separated by one of the first and second signal separating circuits to produce a beat signal; and (e) a circuit that establishes electric connections between adjacent two of the primary radiators and the first and second common feeders, respectively, to radiate the in phase radar waves from the adjacent two of the primary radiators and that determines a position of a target reflecting the radar waves radiated from the primary radiators based on the beat signals produced by the first and second mixers.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
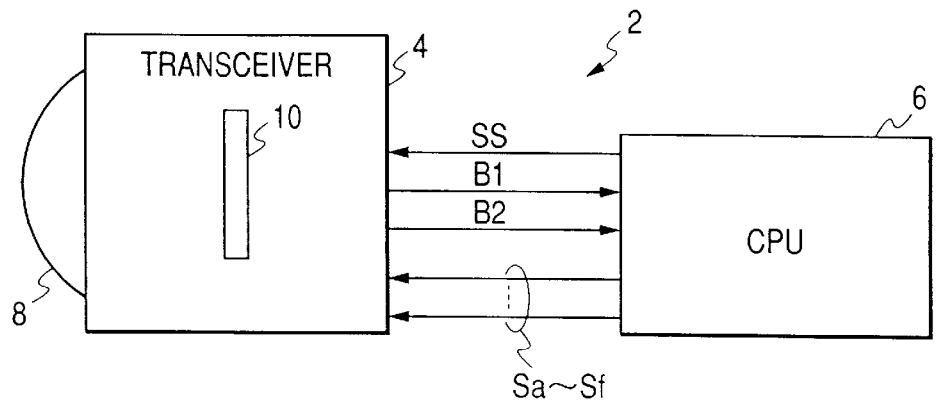
FIG. 1 is a block diagram which shows a radar system according to the present invention.

Referring now to the drawings, particularly to FIG. 1, there is shown a radar system 2 according to the present invention which is designed to track an object or target present within a detectable zone using monopulse techniques.

The radar system 2 generally includes a radio wave transceiver 4 and a signal processing circuit 6. The radio wave transceiver 4 includes a transmitting and receiving circuit 10 and a dielectric lens 8 that concentrates an electromagnetic wave radiated from the transmitting and receiving circuit 10 into a beam and converges beams which have been reflected from a target onto the transmitting and receiving circuit 10. The signal processing circuit 6 activates the radio wave transceiver 4 and handles output signals therefrom to determine the position of the object in a conventional manner.

In the case where the radar system 2 is used to detect an object in front of an automotive vehicle, the radio wave transceiver circuit 4 is installed on the front of the vehicle, and the signal processing circuit 6 is mounted in a vehicle cabin or a console box.

Figure 2:
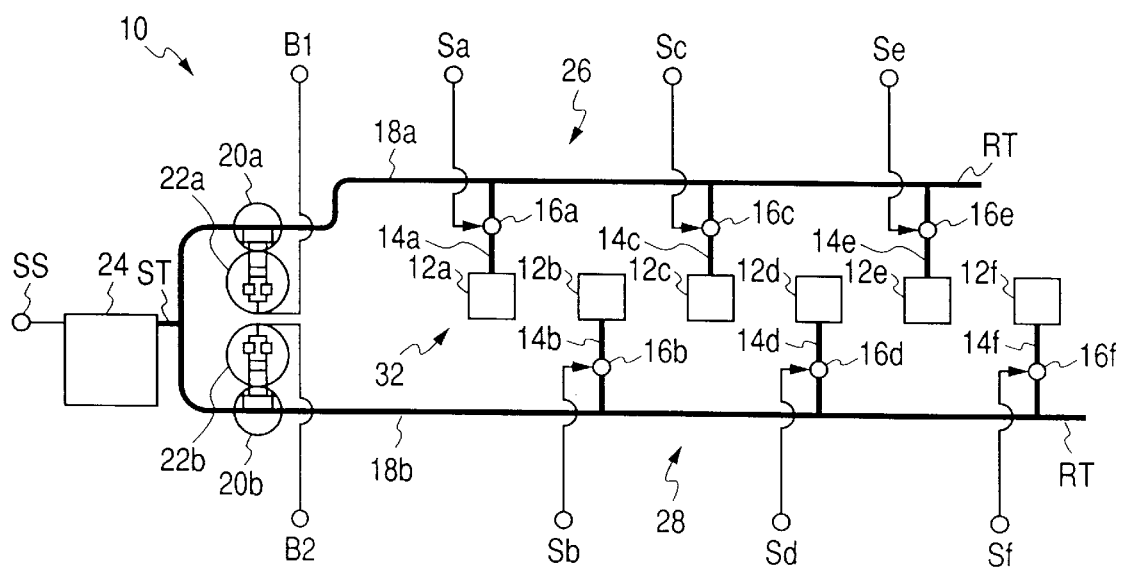
FIG. 2 is a circuit diagram which shows a transceiver circuit used in the radar system of FIG. 1.
Figure 5A:
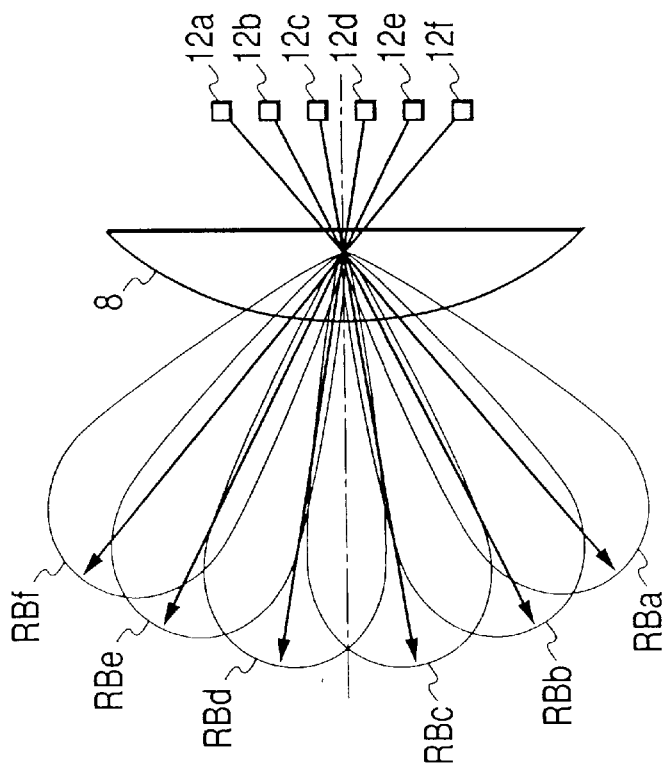
FIG. 5(a) is an illustration which shows return beams received by antenna elements.
Figure 5B:
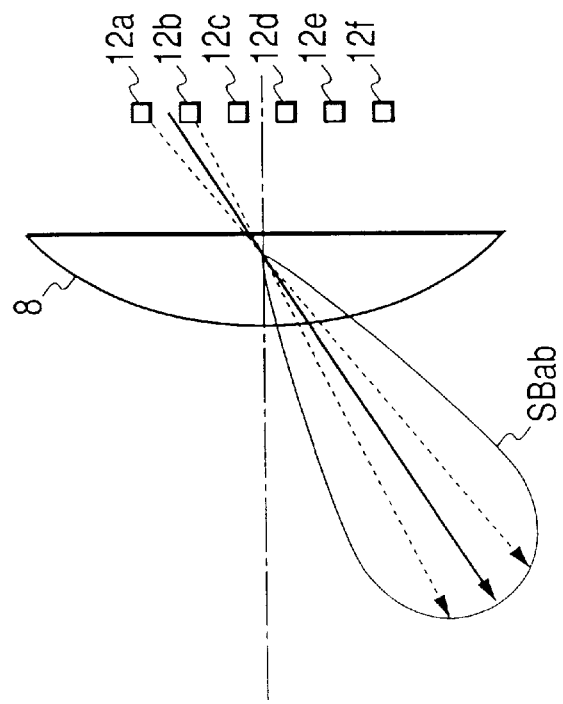
FIG. 5(b) is an illustration which shows a radiated beam formed by radar waves emitted from two of antenna elements.

The transmitting and receiving circuit 10 is formed on a substrate which is made of a dielectric material and has a size of 50×20 mm. The transmitting and receiving circuit 10 constitutes an aperture antenna along with the dielectric lens 8 and includes, as shown in FIG. 2, an antenna array 32, feeders 14a to 14f, switches 16a to 16f, a first common feeder 18a, and a second common feeder 18b. The antenna array 32 consists of six antenna elements 12a to 12f (i.e., primary radiators) disposed on a focal plane of the dielectric lens 8. In practice, the antenna elements 12a to 12f are, as can be seen in FIGS. 5(a) and 5(b), aligned perpendicular to an optical axis of the dielectric lens 8. The antenna arrangement is, however, not to limited to the one shown in FIGS. 5(a) and 5(b). Each of the feeders 14a to 14f is connected to one of the antenna elements 12a to 12f. The switches 16a to 16f are provided, one for each of the feeders 14a to 14f, to establish and block transmission of signals through the feeders 14a to 14f in response to switching signals Sa to Sf outputted from the signal processing circuit 6. The first common feeder 18a connects with three of the antenna elements 12a to 12f disposed at odd positions from the left in the drawing, while the second common feeder 18b connects with other antenna elements 12b, 12d, and 12f.

Each of the antenna elements 12a to 12f is the so-called patch antenna made of a square conductive film. Each of the feeders 14a to 14f and the first and second common feeders 18a and 18b is made of a microstrip line. The first and second common feeders 18a and 18b, as clearly shown in the drawing, extend in parallel to the length of the antenna array 32 on both sides thereof. Specifically, the feeders 14a, 14c, and 14e are connected to first sides of the antenna elements 12a, 12c, and 12e oriented to the same direction, while the other feeders 14b, 14d, and 14f are connected to second sides of the antenna elements 12b, 12d, and 12f opposed to the first sides of the antenna elements 12a, 12c, and 12e. Each of the first and second common feeders 18a and 18b has one end (hereinafter, referred to as a reception terminal RT) opened.

The transmitting and receiving circuit 10 also includes a high-frequency oscillator 24, signal separating circuits 20a and 20b, and mixers 22a and 22b. The high-frequency oscillator connects at a supply terminal ST with the first and second common feeders 18a and 18b and is responsive to an ON-signal SS from the signal processing circuit 6 to produce a high-frequency signal in the millimeter wave band. The signal separating circuit 20a connects with the first common feeder 18a and separates signals passing through the first common feeder 18a into an output signal from the high-frequency oscillator 24 and input signals received by the antenna elements 12a, 12c, and 12e. Similarly, the signal separating circuit 20b connects with the second common feeder 18b and separates signals passing through the second common feeder 18b into an output signal from the high-frequency oscillator 24 and input signals received by the antenna elements 12b, 12d, and 12f. The mixer 22a combines the output signal and the input signals extracted by the signal separating circuit 20a to produce a beat signal B1 having a frequency that is the difference between frequencies of the output and input signals. Similarly, the mixer 22b combines the output signal and the input signals extracted by the signal separating circuit 20b to produce a beat signal B2 having a frequency that is the difference between frequencies of the output and input signals.

In the following discussion, an assembly consisting of the first common feeder 18a, the signal separating circuit 20a, the mixer 22a, the antenna elements 12a, 12c, and 12e, the feeders 14a, 14c, and 14e, and the switches 16a, 16c, and 16e will be referred to as a first circuit 26, and an assembly consisting of the second common feeder 18b, the signal separating circuit 20b, the mixer 22b, the antenna elements 12b, 12d, and 12f, the feeders 14b, 14d, and 14f, and the switches 16b, 16d, and 16f will be referred to as a second circuit 28. Also, the antenna elements 12a to 12f, the feeders 14a to 14f, the switches 16a to 16f, the first and second common feeders 18a and 18b, the signal separating circuits 20a and 20b, and the mixers 22a and 22b will generically be referred to as antenna elements 12, feeders 14, switches 16, common feeders 18, signal separating circuits 20, and mixers 22, respectively.

Figure 3A:
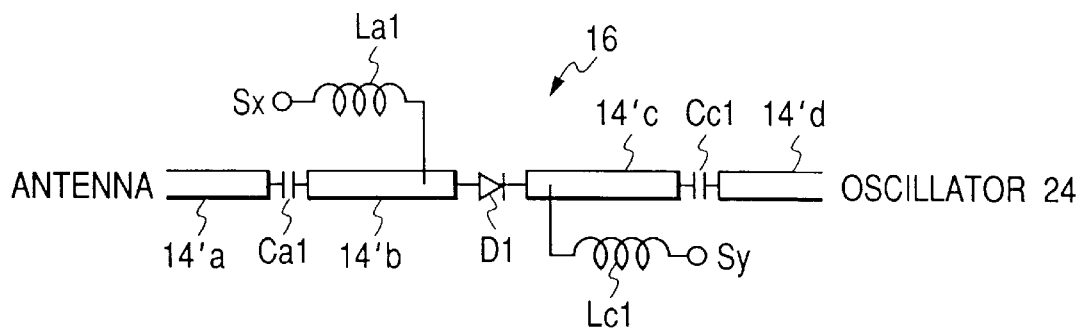
FIG. 3(a) is a circuit diagram which shows a structure of switches used in the transceiver circuit of FIG. 2.

Each of the switches 16 includes, as shown in FIG. 3(a), a diode D1, capacitors Ca1 and Cc1, and coils La1 and Lc1 which are connected in series. The capacitor Ca1 is interposed between a first section 14'a of the feeder 14 connected directly to the antenna element 12 and a second section 14'b. The diode D1 is interposed between the second section 14'b and a third section 14'c. The capacitor Cc1 is interposed between the third section 14'c and a fourth section 14'd connected to the high-frequency oscillator 24 through the common feeder 18. The coils La1 and Lc1 are connected at ends thereof to the second and third sections 14'b and 14'c and at the other ends to the signal processing circuit 6 for reception of switching signals Sx and Sy, respectively.

The transmission of the high-frequency signal from the oscillator 24 to the antenna element 12 is selectively established and blocked by controlling the voltage appearing at a cathode of the diode D1 through the coils La1 and Lc1 using the switching signals Sx and Sy.

Specifically, when the switching signal Sx higher in voltage than the switching signal Sy is provided so that the voltage at an anode of the diode D1 becomes higher than that at the cathode thereof, it will cause the diode D1 to be forward-biased to allow the transmission of the high-frequency signal. Conversely, when the switching signal Sx lower in voltage than the switching signal Sy is provided so that the voltage at the anode of the diode D1 becomes lower than that at the cathode thereof, it will cause the diode D1 to be reverse-biased to block the transmission of the high-frequency signal. Thus, when the diode D1 is turned off, the feeder 14 may be viewed as being opened electromagnetically at a connection to the switch 16. This type of switch will be referred to below as an open switch.

Instead of the cathode biasing circuit which consists of the coil Lc1 and the capacitor Cc1, a common cathode biasing circuit may be disposed in each of the common feeders 18.

Figure 3B:
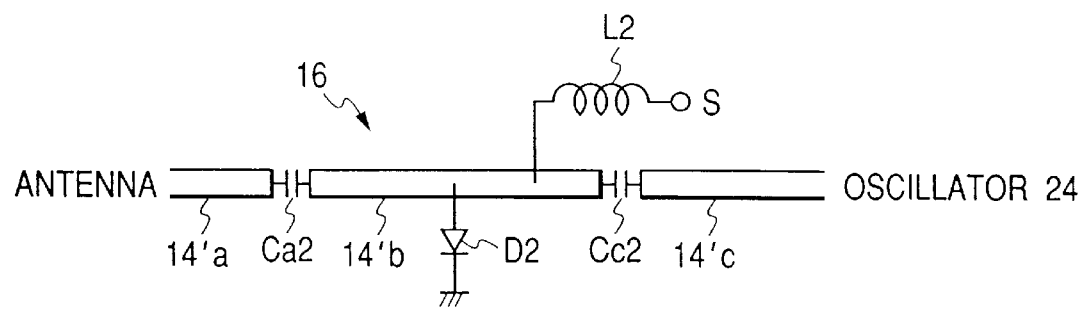
FIG. 3(b) is a circuit diagram which shows an alternative structure of switches used in the transceiver circuit of FIG. 2.

Each of the switches 16 may alternatively be of a short-circuit type, as shown in FIG. 3(b), which includes a diode D2 connected at an anode thereof to the second section 14'b of the feeder 14 and at a cathode thereof to ground, capacitors Ca2 and Cc2 interposed between the first and second sections 14'a and 14'b and between the second and third sections 14'b and 14'c, and a coil L2 connected at one end to the anode of the diode D2 and at the other end to the signal processing circuit 6 for reception of a switching signal S. The transmission of the high-frequency signal from the oscillator 24 to the antenna element 12 is selectively established and blocked by controlling the voltage appearing at the anode of the diode D2 through the coil L2.

Specifically, when the switching signal S having a lower level is inputted to the coil L2, it will cause the diode D2 to be reverse-biased so that it is turned off, thereby allowing the high-frequency signal to pass through the feeder 14 to the antenna 12 without flowing to the diode D2. Conversely, when the switching signal S having a higher level is inputted to the coil L2, it will cause the diode D2 to be forward-biased so that it is turned on, thereby establishing a direct connection of the feeder 14 to ground (i.e., a short-circuit) to block the transmission of the high-frequency signal to the antenna 12.

The capacitors Ca1 and Ca2 may be omitted in either of the open and short-circuit type of switches.

Figure 4:
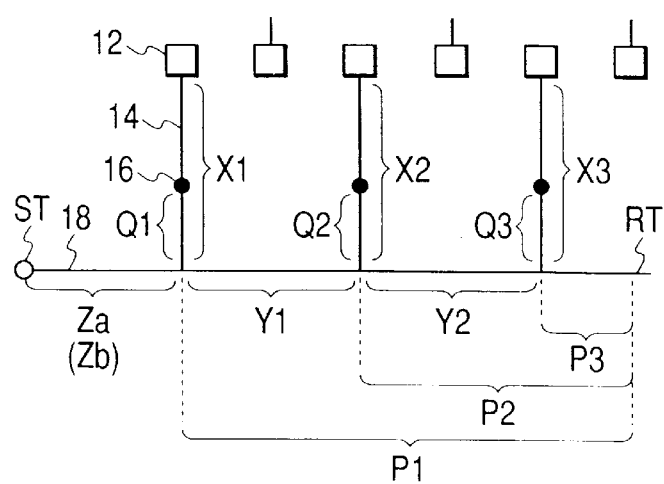
FIG. 4 is a circuit diagram which shows an arrangement of feeders connecting with antenna elements.

FIG. 4 is a schematic illustration showing the structure of each of the first and second circuits 26 and 28.

If the overall lengths of the three feeders 14 of each of the first and second circuits 26 and 28 are defined as X1, X2, and X3, the intervals between junctions of the feeders 14 and the common feeder 18 are defined as Y1 and Y2, and the distance between the supply terminal ST connected to an output terminal of the high-frequency oscillator 24 and first one of the junctions of the feeders 14 and the common feeder 18 is defined as Za in the first circuit 26 and Zb in the second circuit 28, they are determined as $$|Xi-Xj|=m\cdot\lambda \ [i,j=1 \text{ to } 3] \quad (1)$$

$$Yk=m\cdot\lambda \ [k=1, 2] \quad (2)$$

$$|Za-Zb|=m\cdot\lambda+\lambda/2 \quad (3)$$

where m is the integer more than zero, and λ is the wavelength of an output signal of the high-frequency oscillator 24.

Eqs. (1) and (2) show that output signals of the high-frequency oscillator 24 shifted in phase by integral cycles (m cycles), that is, in phase signals are supplied to the three antenna elements 12. Eq. (3) shows that an output signal of the high-frequency oscillator 24 supplied to each of the antenna elements 12 of the first circuit 26 is 180° out of phase with that supplied to each of the antenna elements 12 of the second circuit 28.

The feeders 14 of the first circuit 26 are, as discussed above, connected to the first sides of the antenna elements 12, while the feeders 14 of the second circuit 28 are connected to the second sides of the antenna elements 12 opposed to the first sides of the antenna elements 12 of the first circuit 26. If, therefore, in phase signals are supplied to the first and second circuits 26 and 28, antiphase radar waves are then radiated from the first and second circuits 26 and 28. For this reason, each of the first and second circuits 26 and 28 is constructed according to Eq. (3) so that when antiphase signals are supplied to the antenna elements 12 of the first and second circuits 26 and 28, in phase radar waves may be radiated from all the antenna elements 12.

The feeders of the first and second circuits 26 and 28 may alternatively be connected to the antenna elements 12 so that all the antenna elements 12 are responsive to input of in phase signals from the high-frequency oscillator 24 to radiate in phase radar waves. In this case, the first and second circuits 26 and 28 are constructed, instead of Eq. (3), as $$|Za-Zb|=m\cdot\lambda \quad (3a)$$

Further, if the distances between the reception terminal RT and the first junction of the leftmost antenna element 12 and the common feeder 18, between the reception terminal RT and the second junction of the middle antenna element 12, and between the reception terminal RT and the third junction of the rightmost antenna element 12 are defined as P1, P2, and P3, and the distances between the first to third junctions and the switches 16 are defined as Q1, Q2, and Q3, they are determined as $$Pi=m\cdot\lambda/2 \ [i=1 \text{ to } 3] \quad (4)$$

$$Qj=m\cdot\lambda/2 \ [i=1 \text{ to } 3] \quad (5)$$

Since the reception terminal RT of the common feeder 18, as described above, is opened, when an output signal of the high-frequency oscillator 24 is inputted to the supply terminal ST to generate a standing wave having the same wavelength as that of the output signal of the high-frequency oscillator 24, a node of a current standing wave (i.e., an antinode of a voltage standing wave) will appear at the reception terminal RT of the common feeder 18. Therefore, according to Eq. (4), the junctions of the antenna elements 12 and the common feeder 18 coincide with the nodes of the current standing wave, i.e., they are disposed at locations where a high impedance (i.e., an infinite impedance) is developed on the common feeder 18.

In the case where the switch 16 is of the open type, turning off the switch 16 will cause a standing wave to appear on a portion of the feeder 14 between the common feeder 18 and the switch 16. Thus, according to Eq. (5), the junctions of the antenna elements 12 and the common feeder 18 are disposed at locations where the standing wave on the feeder 14 shows a high impedance. Specifically, when the switch 16 is turned off, the corresponding feeder 14 may be thought of as being disconnected completely from the common feeder 18, thereby reducing a loss of power supplied to some of the antenna elements 12 which are connected to the common feeder 18 through the switches 16 being turned on.

In the case where the reception terminal RT of the common feeder 18 is short-circuited, there will be an antinode of a current standing wave at the reception terminal RT. Eq. (4) is, thus, rewritten as $$Pi = m \cdot \lambda/2 \ [i=1 \text{ to } 3] \quad (4a)$$

Additionally, in the case where the switch 16 is of the short-circuit type, Eq. (5) is rewritten as $$Qj = m \cdot \lambda/2 \ [i=1 \text{ to } 3] \quad (5a)$$

In the thus constructed transmitting and receiving circuit 10, all or some of the antenna elements 12a to 12f connected to the switches 16a to 16f being turned on are excited by output signals of the high-frequency oscillator 24 to radiate in phase radio radar waves.

In operation to control the radio wave transceiver 4 for tracking a target, the signal processing circuit 6 produces the ON-signal SS to activate the high-frequency oscillator 4 and then adjusts the level of the switching signals Sa to Sf so as to activate one pair of adjacent antenna elements (i.e., 12a and 12b, 12b and 12c, 12c and 12d, 12d and 12e, or 12e and 12f) as a transmitting and receiving antenna array. The transmitting and receiving antenna array then radiates in phase radar waves. The signals received by the two antenna elements of the transmitting and receiving antenna array are supplied to the mixers 22a and 22b through the signal separating circuits 20a and 20b to produce the beat signals B1 and B2, respectively. The signal processing circuit 6 handles the beat signals B1 and B2 in a conventional manner to obtain information about the azimuth angle and relative speed of a target and the distance to the target.

One of the pairs of adjacent antenna elements 12a and 12b, 12b and 12c, 12c and 12d, 12d and 12e, and 12e and 12f used as the transmitting and receiving antenna array is switched sequentially to adjacent one to update the beat signals B1 and B2.

FIG. 5(a) shows return beams RBa to RBf received by the antenna elements 12a to 12f. FIG. 5(b) shows a radiated beam SBab formed by radar waves emitted from the transmitting and receiving antenna array (which consists of the antenna elements 12a and 12b in the drawing).

As can be seen from FIG. 5(a), the antenna elements 12a to 12f are so arranged that adjacent two of the antenna elements 12a to 12f have partially overlapping lobes in the radiation pattern to form a target detectable zone which is in contact with adjacent one.

The two antenna elements 12a and 12b selected as the transmitting and receiving antenna array may be, as can be seen from FIG. 5(b), considered as a single antenna which radiates the beam SBab. The beam SBab covers an area where the beams RBa and RBb received by the antenna elements 12a and 12b overlap, that is, the target detectable zone.

Specifically, even if any of the pairs of the antenna elements 12a and 12b, 12b and 12c, 12c and 12d, 12d and 12e, and 12e and 12f is selected, the target detectable zone of the selected antenna element pair is covered by the beam SB radiated from the same antenna element pair. All the target detectable zones formed by the received beams RBa to RBf are, thus, covered by the beams RBab radiated from all the pairs of the antenna elements 12a and 12b, 12b and 12c, 12c and 12d, 12d and 12e, and 12e and 12f by changing one of the pairs of the antenna elements used as the transmitting and receiving antenna array sequentially.

As apparent from the above, the beam radiated from the antenna element pair used as the transmitting and receiving antenna array is sufficient to cover only one of the target detectable zones where the beams received by the same antenna element pair overlap. This means that it is possible to narrow a lobe of the beam RBab formed by radar waves radiated from one of the pairs of antenna elements 12a to 12f without increasing the power of the beam RBab and sacrificing a target detectable length. This enables the radar system 2 to track a preceding vehicle quickly which has cut in in front of a system vehicle and to detect an obstacle on a side of a curved road with high accuracy.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the radar system 2 may be designed as the so-called FMCW radar. In this case, the high-frequency oscillator 24 is constructed to produce a signal which is modulated so as to have a triangle waveform. The wavelength $\lambda$ of a standing wave is changed depending upon an output of the high-frequency oscillator 24, but it will not be objectionable because a signal radiated by the FMCW radar usually has a frequency of several GHz to several tens of GHz, while the amount of frequency modulation is on the order of several tens of MHz, meaning that the degree to which the wavelength $\lambda$ of the standing wave is very small.

The radar system 2 uses the six antenna elements 12a to 12f, but the present invention may be realized by using at least three antenna elements.

Figure 6A:
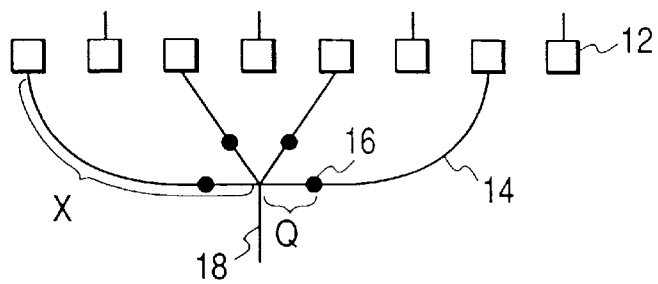
FIGS. 6(a) to 6(c) are circuit diagrams which show first to third modifications of an arrangement of feeders connecting with antenna elements.

The feeders 14 may extend, as shown in FIG. 6(a), from a single terminal leading to the common feeder 18.

Figure 6B:
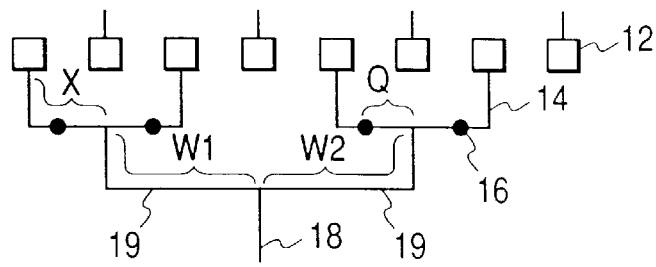

The feeders 14 may alternatively extend, as shown in FIG. 6(b), from two branch lines 19 leading to the common feeder 18. In this case, the overall lengths W1 and W2 of the branch lines 19 are determined as $$|W1 - W2| = m \cdot \lambda \quad (6)$$

$$Wi = m \cdot \lambda/2 \ [i=1,2] \quad (7)$$

Figure 6C:
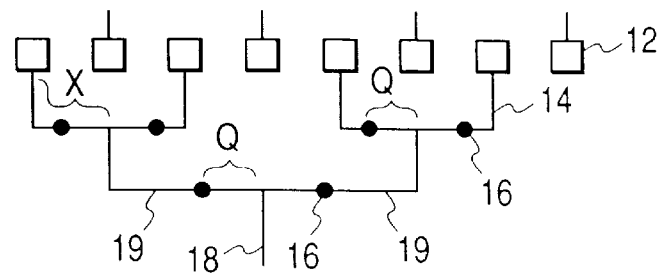

The switches 16 may also be installed, as shown in FIG. 6(c), on the branch lines 19. In this case, the location of each of the switches 16 is determined using Eq. (5) or (5a) according to the type of the switches 16, replacing the junction of the feeders 14 with the junction of the branches 19.

The dielectric lens 8 may be replaced with a reflector used in the parabolic antenna or Cassegrain antenna.

What is claimed is:

1. An aperture antenna comprising:

an electromagnetic wave converging device;

at least three primary radiators disposed on a focal plane of said electromagnetic wave converging device; and a feeding circuit that feeds electromagnetic signals to an adjacent two of said primary radiators to radiate in phase electromagnetic waves and that extracts signals received by the adjacent two of said primary radiators separately.

2. An aperture antenna as set forth in claim 1, wherein said feeding circuit includes a first common feeder connecting with a first radiator group consisting of some of said primary radiators arranged alternately through first discrete feeders, a second common feeder connecting with a second radiator group consisting of the other primary radiators through second discrete feeders, and switching means for selectively allowing and blocking passage of a signal through each of the first and second discrete feeders, and wherein a difference in length between any two of the first discrete feeders and a difference in length between any two of the second discrete feeders are integral multiples of a wavelength of the electromagnetic signals, respectively, and wherein an interval between any two of junctions of the first common feeder and the first discrete feeders and an interval between any two of junctions of the second common feeder and the second discrete feeders are integral multiples of the wavelength of the electromagnetic signals, respectively.

3. An aperture antenna as set forth in claim 2, wherein said switching means includes switching circuits each of which is disposed in one of the first and second discrete feeders so as to isolate each of the first and second discrete feeders electromagnetically from corresponding one of the first and second common feeders.

4. An aperture antenna as set forth in claim 2, wherein each of the first and second discrete feeders is so connected to one of the first and second common feeders that a current standing wave that has the same wavelength as that of the electromagnetic signals and that is produced on each of the first and second common feeders during feed shows a node at each of said junctions, and wherein each of the first and second discrete feeders includes a first line leading to one of said primary radiators and a second line leading to one of the first and second common feeders, the first and second lines being connected and disconnected electromagnetically through said switching means, a connection between the first and second lines of each of the first and second discrete feeders lying at the node of the current standing wave.

5. An aperture antenna as set forth in claim 4, wherein said switching means blocks the passage of the signal through each of the first and second discrete feeders by electrically opening the connection between the first and second lines of each of the first and second discrete feeders, and wherein a length of each of the second lines is an integral multiple of half the wavelength of the electromagnetic signals.

6. An aperture antenna as set forth in claim 4, wherein said switching means blocks the passage of the signal through each of the first and second discrete feeders by establishing a short circuit between the connection of the first and second lines of each of the first and second discrete feeders and ground, and wherein a length of each of the second lines is the sum of an integral multiple of half the wavelength of the electromagnetic signals and one fourth of the wavelength of the electromagnetic signals.

7. An aperture antenna as set forth in claim 2, wherein the first and second common feeders connect with the first and second discrete feeders through a first set of branch lines and a second set of branch lines, respectively, a connection of the first set of branch lines to the first common feeder and a connection of the second set of branch lines to the second common feeder lying at a node of a current standing wave that has the same wavelength as that of the electromagnetic signals and that is produced on each of the first and second feeders during feed.

8. An aperture antenna as set forth in claim 2, wherein said primary radiators are disposed in alignment with each other to form an antenna array, and wherein said first and second common feeders extend on both sides of the length of the antenna array.

9. A radar system comprising:

an aperture antenna including an electromagnetic wave converging device and at least three primary radiators disposed on a focal plane of the electromagnetic wave converging device;

a high-frequency oscillator that supplies high-frequency signals to said primary radiators through first and second common feeders to radiate in phase radar waves;

first and second signal separating circuits that are connected to said first and second common feeders, respectively, each of the first and second signal separating circuits separating signals appearing on one of the first and second common feeders into the high-frequency signal supplied from said high-frequency oscillator and a signal received by said aperture antenna;

first and second mixers that are connected to said first and second signal separating circuits, respectively, each of said first and second mixers mixing the high-frequency signal and the received signal separated by one of said first and second signal separating circuits to produce a beat signal; and a circuit that establishes electrical connections between an adjacent two of the primary radiators and said first and second common feeders, respectively, to radiate the in phase radar waves from the adjacent two of the primary radiators and that determines a position of a target reflecting the radar waves radiated from said primary radiators based on the beat signals produced by said first and second mixers.

* * * * *